United States Patent Office 3,772,338
Patented Nov. 13, 1973

---

3,772,338
NAPHTHALIDES AND THEIR PREPARATION
Richard B. Greenwald, Framingham, Mass., assignor to Polaroid Corporation, Cambridge, Mass.
No Drawing. Filed Oct. 26, 1971, Ser. No. 192,638
Int. Cl. C07d 7/26
U.S. Cl. 260—343.2 R            19 Claims

ABSTRACT OF THE DISCLOSURE

This invention relates to the synthesis of naphthol naphthalide indicator dyes by reacting a 3-halo-3-(4'-hydroxy naphthyl)naphthalide and a 1-naphthol in the presence of a heavy metal salt as catalyst.

BACKGROUND OF THE INVENTION

(1) Field of the invention

This invention relates to a novel method of preparing indicator dyes and to novel intermediates useful in the preparation thereof.

(2) Description of the prior art

Dyes which undergo a change in spectral absorption characteristics in response to a change in pH are well known in the art, and frequently, are referred to as indicator or pH-sensitive dyes. Typically, these dyes change from one color to another, from colored to colorless or from colorless to colored on the passage from acidity to alkalinity or the reverse and are commonly employed in analytical chemical procedures to measure changes in pH value. Among the indicator dyes most widely used is the group derived from phthaleins as exemplified by phenolphthalein, thymolphthalein, cresolphthalein and 1-naphtholphthalein.

Though various methods have been used for synthesizing phthalein indicator dyes, they are generally prepared via the Friedel-Crafts reaction by condensing the selected phenol or 1-naphthol with phthalic or naphthalic acid, their anhydrides or acid chlorides at elevated temperature in the presence of a suitable catalyst, for example, zinc chloride or sulfuric acid to yield the corresponding symmetrical, i.e., bis-phenol or bis-naphthol phthalide or naphthalide. Unsymmetrical phthaleins and mixed phthalein indicator dyes, such as, benzene-resorcinol phthalide are prepared in a similar manner by condensing an o-aroyl benzoic acid dye intermediate with the selected phenol also in the presence of a suitable catalyst, such as, sulfuric acid at elevated temperature.

The present invention is concerned with a new method of synthesizing certain phthalein indicator dyes, namely, naphthalide dyes and particularly, 1-naphthol naphthalides.

SUMMARY OF THE INVENTION

It is, therefore, the primary object of the present invention to provide a novel method of synthesizing indicator dyes.

It is another object of the present invention to provide a method of synthesizing 1-naphthol naphthalides which may be symmetrical or unsymmetrical indicator dyes.

It is a further object of the present invention to provide novel intermediates useful in the preparation of such dyes.

Other objects of this invention will in part be obvious and will in part appear hereinafter.

The invention accordingly comprises the process involving the several steps and the relation and order of one or more of such steps with respect to each of the others and the product possessing the features, properties and the relation of elements which are exemplified in the following detailed disclosure and the scope of the application of which will be indicated in the claims.

According to the present invention, a method of preparing indicator dyes is provided wherein a 1-naphthol naphthalide intermediate in the form of its pseudo halide is reacted with a 1-naphthol in the presence of a heavy metal salt and preferably, an organic soluble heavy metal salt to form the corresponding 1-naphthol naphthalide dye.

Because the reaction conditions are milder than those normally encountered in prior art procedures, the present method allows greater latitude in the selection of 1-naphthol reactants. For example, the more sensitive naphthols, such as, those containing carboxy substituents may be employed without the loss of the carboxy groups and the formation of substantial amounts of decarboxylated by-products that usually occurs under Friedel-Crafts conditions. Since the present method is not limited to the more stable compounds, it allows greater latitude in the dyes that may be produced which includes not only symmetrical or bis naphthol naphthalides but unsymmetrical dyes as well.

For a fuller understanding of the nature and objects of the present invention reference should be had to the following detailed description.

DESCRIPTION OF THE PREFERRED EMBODIMENTS

Specifically, the method of the present invention comprises reacting (a) a 3-halo-3-(4'-hydroxy-1'-naphthyl) naphthalide intermediate and (b) a 1-naphthol in non-protonic organic media under anhydrous conditions in the presence of a heavy metal salt to form (c) the corresponding 3,3-disubstituted naphthalide wherein the 3,3 substituents are 4'-hydroxy-1'-naphthyl radicals, the same or different.

In a preferred embodiment of the present invention, 1-naphthol naphthalides are prepared wherein at least one of the naphthyl radicals is substituted with a carboxy group adjacent to the naphtholic —OH. The method of the preferred embodiment comprises the step of reacting (a) a 3-halo-3-(3'-COOR-4'-hydroxy-1'-naphthyl) naphthalide intermediate wherein said R is selected from hydrogen and alkyl and (b) a 1-naphthol in non-protonic organic media in the presence of a heavy metal salt to form (c) the corresponding 3-(3'-COOR-4'-hydroxy-1'-naphthyl) - 3 - (4'-hydroxy-1'-naphthyl)napthalide, and when R is alkyl, includes the additional step of converting said 3'-COOR group to a carboxy group to form the corresponding 3 - (3'-carboxy-4'-hydroxy-1'-naphthyl)-3-(4'-hydroxy-1'-naphthyl)naphthalide.

The latter two-step reaction sequence using a silver salt as the heavy metal catalyst is illustrated below wherein R is alkyl, X is halo and B'—H represents the 1-napthol which ultimately comprises the B radical, i.e., second napthyl radical in the final dye.

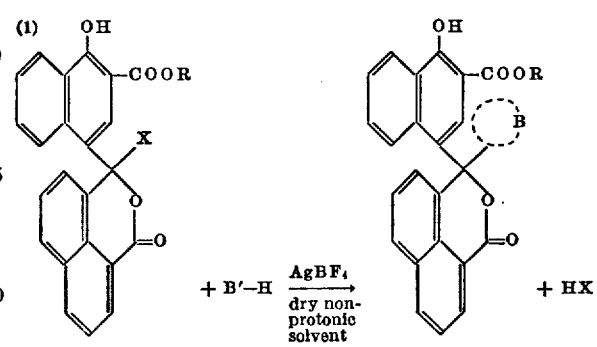

(2) 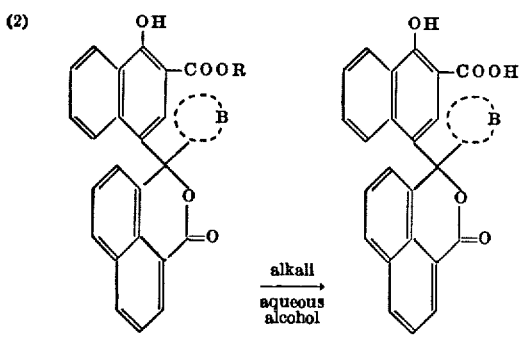

Typical of the indicator dyes that may be prepared according to the present invention are those represented by the (I) 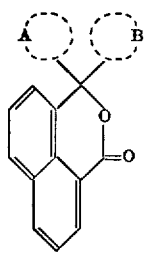

wherein A and B are 4'-hydroxy-1'-naphthyl radicals, the same or different.

The indicator dyes defined above and as represented in the above formula may contain additional substituents as may be desired which do not interfere with the function of the dye for its selected ultimate use. Typical substituents include alkyl, such as, methyl, ethyl, isopropyl, n-butyl, t-butyl, hexyl, octyl, dodecyl, hexadecyl, octadecyl and eicosanyl; aryl, such as, phenyl, 2-hydroxyphenyl, and naphthyl; alkaryl, such as, benzyl, phenethyl, phenylhexyl, p-octylphenyl, p-dodecylphenyl; alkoxy, such as, methoxy, ethoxy, butoxy, 1-ethoxy-2-($\beta$-ethoxyethoxy), dodecyloxy and octadecyloxy; aryloxy, such as, phenoxy, benzyloxy, naphthoxy; alkoxyalkyl, such as, methoxyethyl, dodecyloxyethyl; halo, such as, fluoro, bromo, and chloro; trifluoralkyl, such as, trifluoromethyl, mono- and bis-trifluoromethyl carbinol; sulfonamido; sulfamoyl; acyl and its derivatives; aminomethyl; amido; sulfonyl; sulfo; cyano; nitro; amino including mono- and disubstituted amino, e.g., N-ethyl amino and N,N'-dimethylamino; carboxy; and hydroxyl. Such substituents may be substituted on one or both of the naphthyl radicals and/or on the naphthalide ring-closing moiety.

For use as optical filter agents in photographic processes, such as, diffusion transfer processes employing highly alkaline processing solutions, it may be desirable that the indicator dye selected as the optical filter agent possess a relatively high pKa so that the dye will be in a light-absorbing form during the initial stages of processing and yet may be rendered substantially non-light absorbing within a relatively brief interval as the pH subsequent to substantial image formation is reduced in order to permit early viewing of the image. Such dyes may be prepared according to the present invention by appropriate selection of the 1-naphthols which ultimately comprise the A and/or B radicals. For example, the naphthol naphthaleins having a carboxy substituent ortho to the naphtholic —OH produced according to the preferred embodiment possess a relatively high pKa which makes them particularly useful as optical filter agents in the aforementioned processes. If desired, the 1-naphthol selected to provide the B radical also may contain a hydrogen-bonding group, such as, a carboxy group substituted on a carbon atom adjacent to the functional —OH. Alternatively, the A and/or B radicals may contain hydrogen-bonding groups other than carboxy groups.

As an illustration, in Formula I above, the A radical may comprise

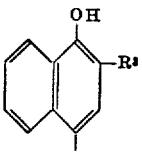

wherein $R^3$ is a hydrogen-bonding group and the B radical may comprise

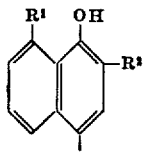

wherein one of $R^1$ and $R^2$, and preferably $R^2$, is a hydrogen-bonding group and the other is hydrogen. High pKa 1-naphthol phthaleins and naphthaleins substituted with hydrogen-bonding groups in this manner form the subject matter of copending U.S. patent application Ser. No. 103,865 filed Jan. 4, 1971.

As the $R^1$, $R^2$ or $R^3$ group, any hydrogen-bonding group may be used that is capable of raising the pKa. The association of two atoms through hydrogen to form a hydrogen bond between or within molecules is well known. When hydrogen is attached to an electronegative atom, for example, O or N, the resultant bond is polarized. If directed toward another atom (M) with an unshared pair of electrons, the hydrogen acts as a bridge between the atoms (O—H . . . M) due to the electrostatic attraction to both atoms between which the hydrogen proton can be transferred. In the above compounds an intramolecular hydrogen bond is formed between the p-hydroxy group and the adjacent hydrogen-bonding group, i.e., a group containing a heteroatom possessing an active unshared pair of electrons, such as, O, N, S or halogen, e.g., F, which has a free electron pair or a negative charge in basic solution and which is capable of forming a 5-, 6- or 7-membered and preferably a 5- or 6- membered hydrogen-bonded ring with the functional, i.e., naphtholic —OH. Preferably, the heteroatom in the hydrogen-bonding group has attached to it a proton which is more acidic than the proton on the naphtholic —OH and ionizes in basic solution to a negative charge. Such groups include, for example, carboxy; hydroxy; o-hydroxyphenyl; bis trifluoromethyl carbinol; sulfonamido (—NH—SO$_2$—R' wherein R' may be alkyl, aryl, alkaryl); and sulfamoyl (—SO$_2$—NH—R" wherein R" may be alkyl, aryl, alkaryl). Suitable R' and R" substituents include branched or straight chain alkyl, e.g., methyl, ethyl, isopropyl, n-butyl, t-butyl, hexyl, actyl, dodecyl, hexadecyl, octadecyl and eicosanyl; aryl, e.g., phenyl and naphthyl; and alkaryl, e.g., benzyl, phenethyl, phenylhexyl, p-octylphenyl and p-dodecylphenyl.

Specific examples of 1-naphthol indicator dyes that may be prepared according to the method of the present invention are as follows:

(1)

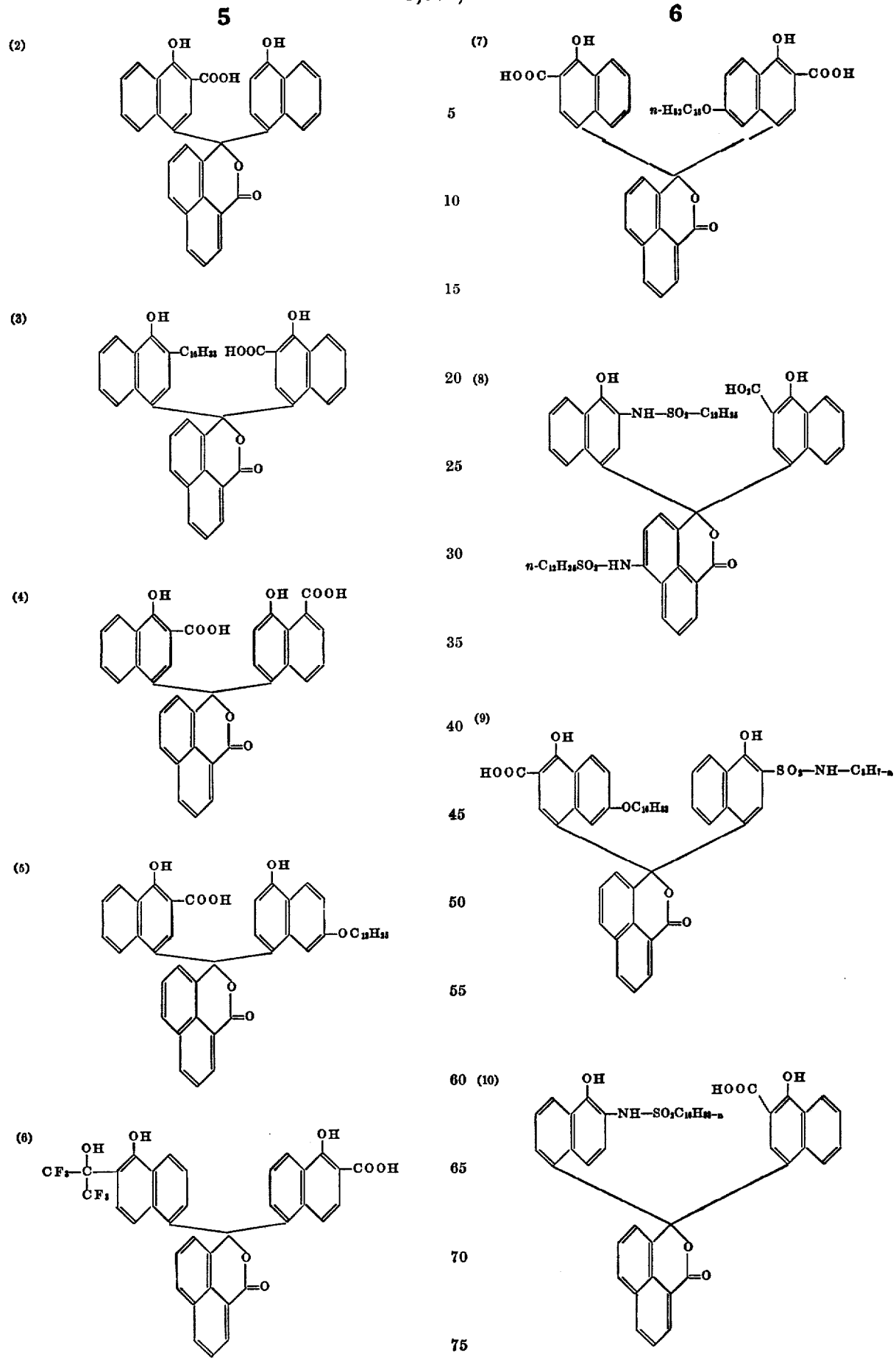

(11) 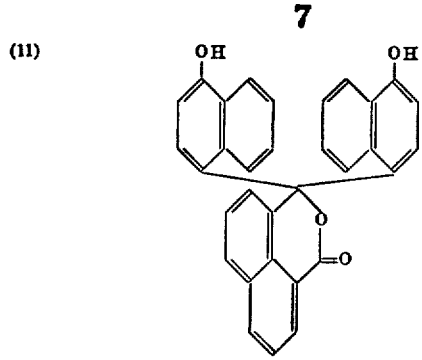
(12) 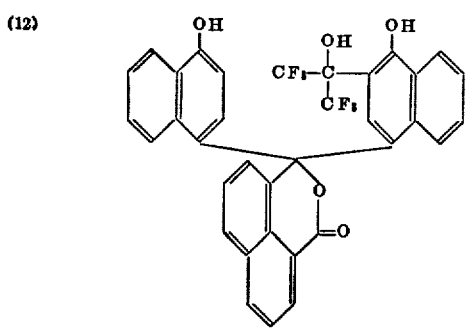
(13) 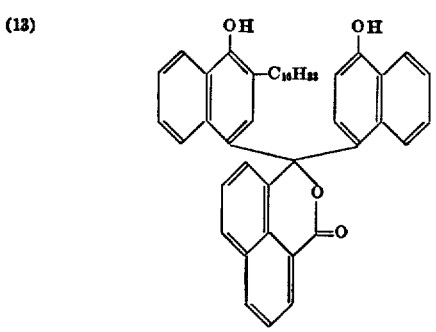
(14) 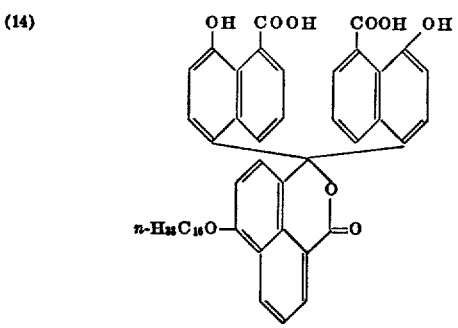
(15) 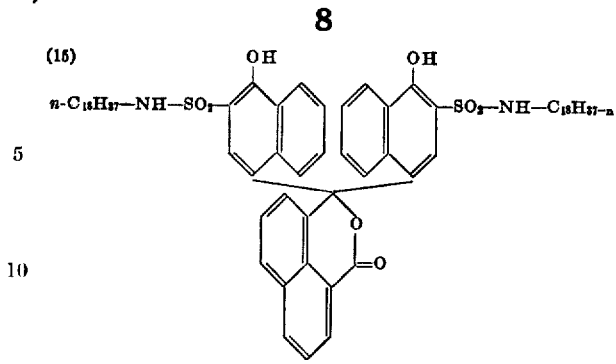
(16) 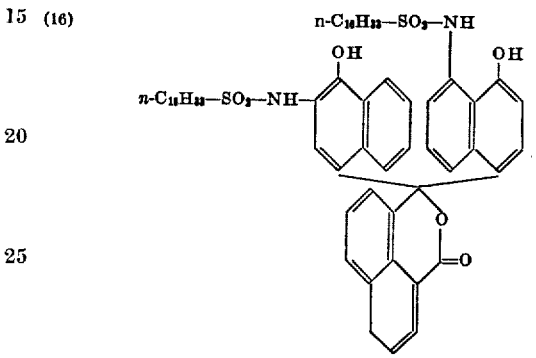
(17) 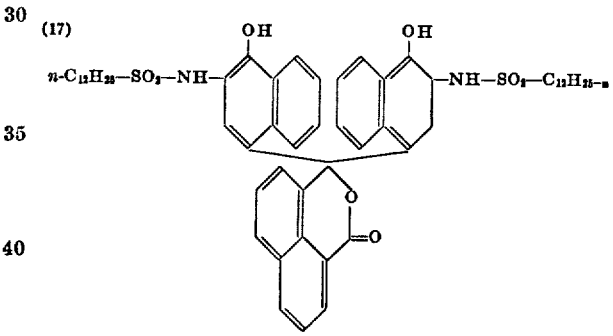
(18) 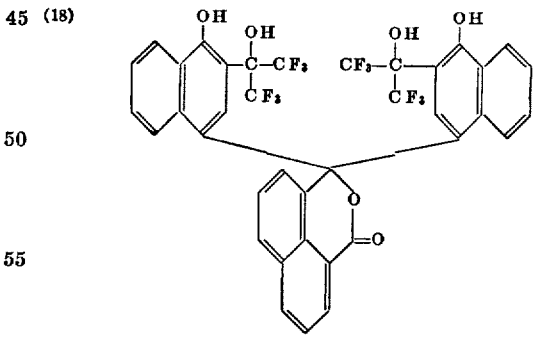
(19) 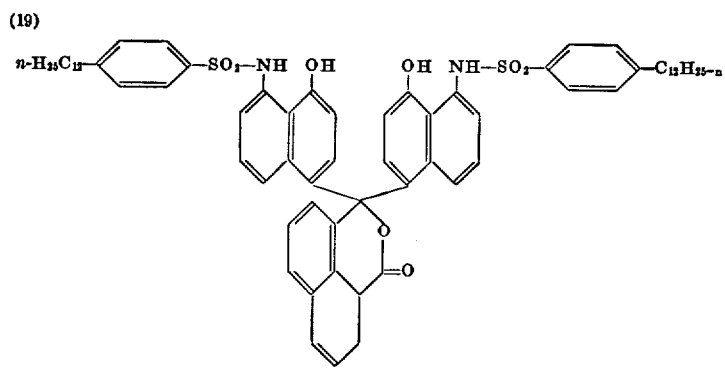

(20) 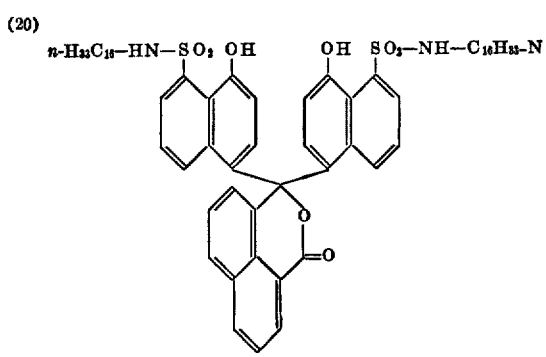

(21) 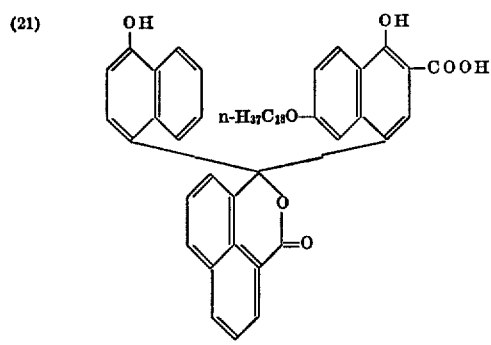

(22) 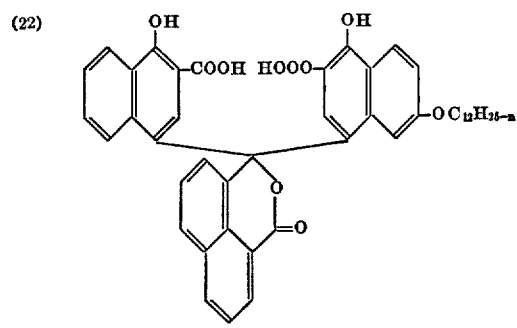

(23) 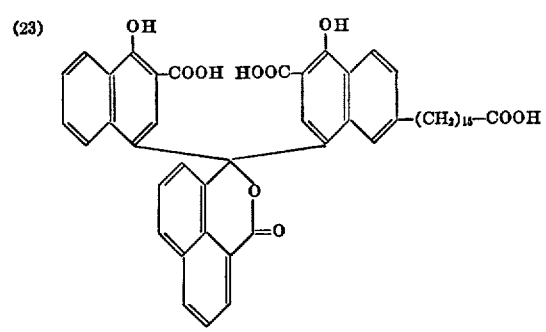

The novel intermediates of the present invention may be represented by the formula:

(II) 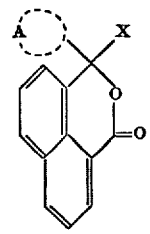

wherein A represents a 4'-hydroxy-1'-naphthyl radical, substituted or unsubstituted, and X is halo, preferably chloro or bromo. Illustrative substituents include those enumerated above as may be desired in the final dye. In the preferred embodiment, as noted previously, the A radical comprises

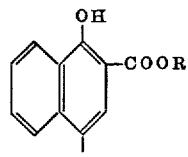

wherein R is hydrogen or alkyl, usually having 1 to about 20 carbon atoms, such as, methyl, ethyl, propyl, isopropyl, butyl, t-butyl, octyl, decyl, dodecyl, octadecyl and eicosanyl.

Specific examples of the pseudo halide intermediates of the present invention include:

(24) 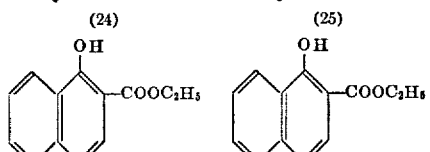   (25) 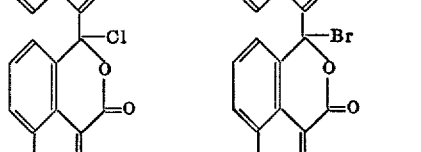

(26) 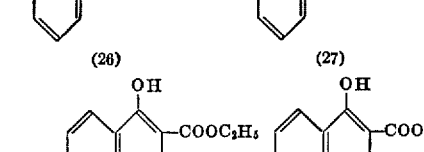   (27) 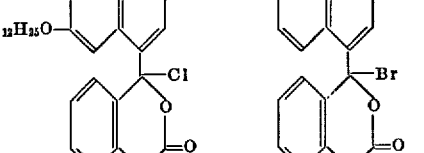

(28) 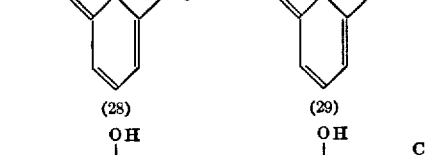   (29) 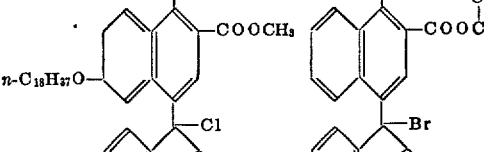

(30) 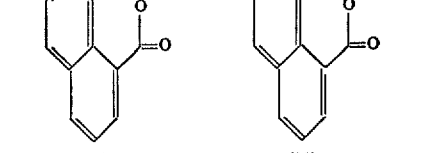   (31)

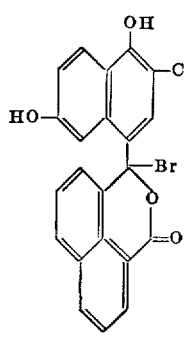
(32)

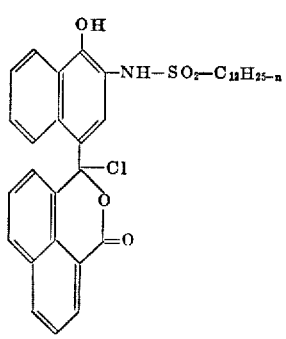
(33)

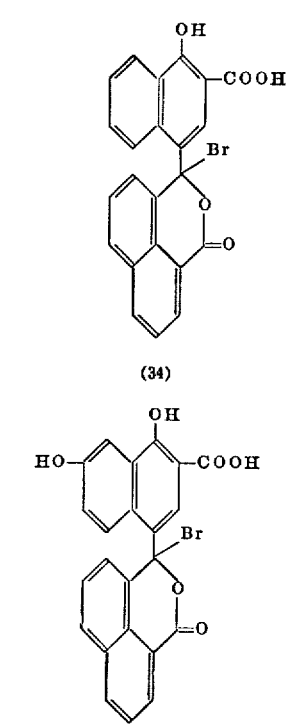
(34)   (35)

(36)   (37)

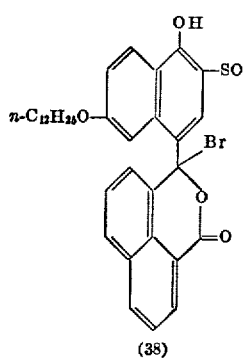
(38)

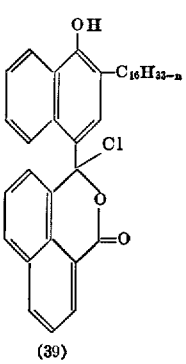
(39)

The above intermediates may be readily prepared by halogenation of the corresponding ketol, for example, by treating the ketol with phosphorus pentachloride, thionyl chloride, phosphorus oxychloride, sulfuryl chloride, phosphorus tribromide, N-bromosuccinimide, aluminum bromide, aluminum chloride, boron tribromide, N-bromocaprolactam, cupric bromide or other conventional chlorination or bromination reagent.

The ketol, such as, 3-hydroxy-3-(3'-carboalkoxy-4'-hydroxy-1'-naphthyl)naphthalide may be prepared by reacting a 1-hydroxy-2-alkyl naphthoate with naphthaldehydic acid in the presence of an acid catalyst to form the corresponding 4-naphthalidyl-1-hydroxy-2-alkyl naphthoate. The naphthalidyl-substituted naphthoate thus obtained may be oxidized to form the ketol directly or oxidized under anhydrous conditions to form a dehydro intermediate which upon hydration yields the ketol. This reaction sequence is illustrated below.

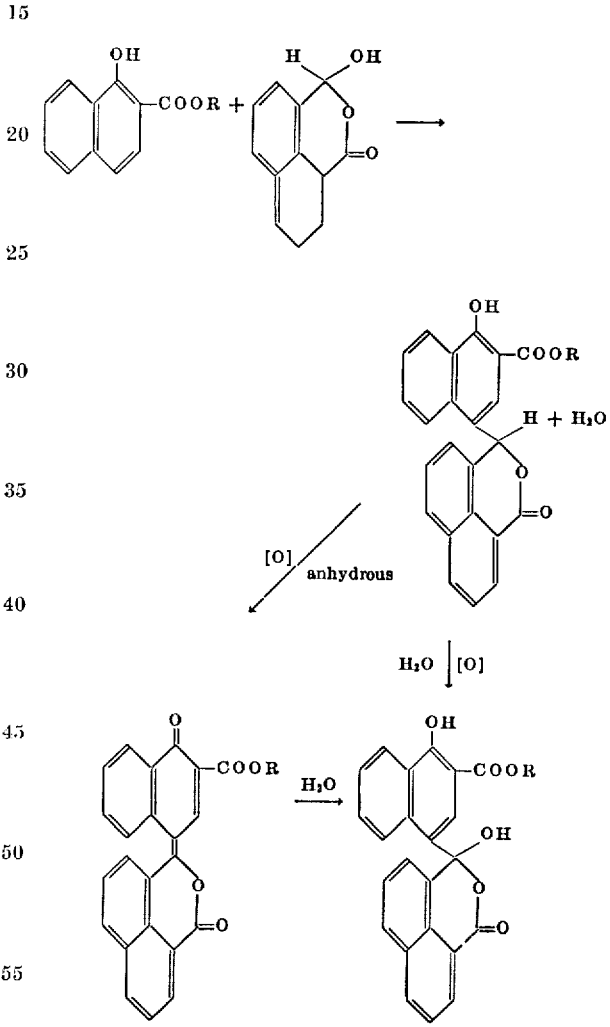

Ketol and dehydro intermediates of certain naphthalidyl-substituted N-heterocyclic compounds and of certain naphthalidyl-substituted p-hydroxy carbocyclic compounds, such as, those above and their synthesis by the method illustrated above form the subject matter of co-pending U.S. patent application Ser. No. 108,662 filed Jan. 21, 1971.

The ketol also may be prepared by other methods. For example, 3-hydroxy-3-(3'-carboalkoxy-4'-hydroxy-1'-naphthyl)naphthalide may be prepared by forming a complex solution of a 1-hydroxy-2-alkyl naphthoate by treating the naphthoate with anhydrous aluminum chloride followed by the addition of solvent, such as, nitrobenzene and then reacting the complex solution with 3,3-dichloro naphthalide. This reaction sequence is illustrated below.

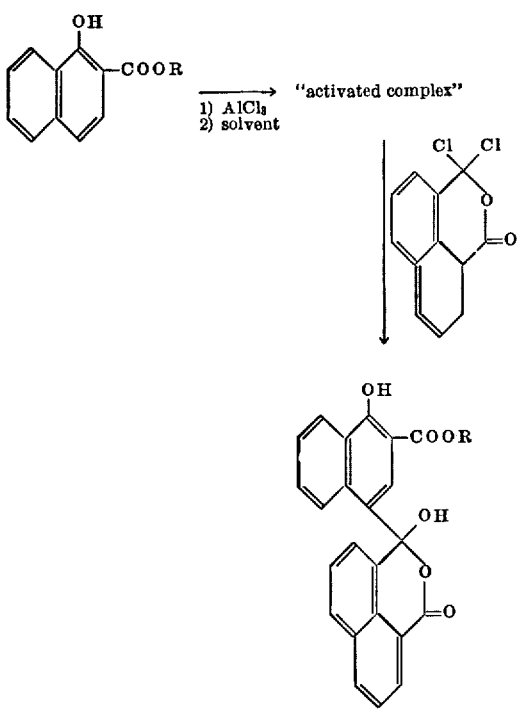

In carrying out step (1) of the present method, the pseudo halide intermediate and the selected 1-naphthol are reacted in an organic solvent under anhydrous conditions. Though it is not essential, it is preferred to conduct the reaction in a dry inert atmosphere, for example, under nitrogen or argon. The reaction temperature may vary over a relatively wide range from room temperatue, i.e., about 20° C. up to elevated temperatures of about 120° C. which may be readily determined for the particular reactants. To achieve practical reaction rates, the reaction is usually conducted at a temperature between about 80° and 100° C.

The 1-naphthol selected for reaction with the pseudo halide may contain one or more substituents as may be desired in the final dye provided that it has an unsubstituted 4-position, i.e., a free position para to the naphtholic —OH group. Illustrative substituents are those enumerated above.

The heavy metal catalyst may be a salt, such as, the acetate of any of the negative heavy metals, for example, lead, gold, nickel, zinc, cadmium, platinum, palladium and preferably, silver and mercury including mercuric and mercurous salts. Though not essential, the heavy metal salt is preferably soluble in the organic media. Organic soluble silver and mercury salts have been found particularly satisfactory. Examples of specific catalysts include silver tetrafluoroborate, silver hexafluoroantimonate, silver acetate, silver trifluoroacetate, silver hexafluorophosphate, silver nitrate, silver perchlorate, silver acetylacetonate, silver thiocyanate, mercuric sulfate, mercuric acetate, mercurous perchlorate and mercurous acetate.

Ordinarily, the pseudo halide intermediate is used in substantially equimolar proportions or in a slight excess over the amount of 1-naphthol. A ratio of between about 1.0 and 1.5 moles of intermediate per 1 mole of naphthol has been found satisfactory. The heavy metal salt employed as the catalyst also is used in amounts ranging between about 1.0 and 1.5 moles per mole of naphthol.

The organic media may comprise any dry, i.e., anhydrous non-protonic organic solvent, such as, tetrahydrofuran, dimethoxyethane, dimethylsulfoxide, cyclohexane, toluene, methylene chloride, benzene, 1,4-dioxane, and N,N-dimethylformamide.

Conversion of the 3'-carboalkoxy group to the free acid group in step (2) may be accomplished in any suitable and convenient manner, for example, by hydrolysis, preferably alkaline hydrolysis. Conversion to the carboxy group is conveniently achieved by treating the carboalkoxynaphtholnaphthol naphthalide with an alkaline hydroxide in aqueous or aqueous alcohol solution. The alkaline hydroxide may be an alkaline earth hydroxide, such as, calcium or barium hydroxide or preferably, an alkali metal hydroxide, such as, sodium or potassium hydroxide. The alcohol employed is usually a lower alkanol, such as, methanol, ethanol or propanol. It will be appreciated that other carboalkoxy groups, if present, also may be converted to the free acid group in this manner.

The following examples are given to further illustrate the present invention and are not intended to limit the scope thereof.

EXAMPLE 1

Preparation of the compound of Formula 7

(a) Dry 1-hydroxy-2-naphthoic acid (50 gms., 0.266 mole) was suspended in 350 ml. dry benzene in a flame-dried 1 liter 1-neck round bottom flask under an air condenser and drying tube. Thionyl chloride (31.7 gms., 0.266 mole) was added in one portion followed by 1.5 ml. dry N,N-dimethyl-formamide. The reaction mixture was stirred magnetically 2–3 days at room temperature. Insoluble material (6.5 gms.) was removed by filtration, and the yellow-tan filtrate was evaporated to dryness to give pale yellow 1-hydroxy-2-naphthoyl chloride, M.P. 87°–88° C. Chilled anhydrous methanol (100 ml.) was added quickly to the solid chloride in an exothermic reaction. The partial solution was heated about 5 minutes on the steam bath under a drying tube then allowed to cool. The suspension was chilled and the solid was collected to give 43 gms. (92% by weight) of 1-hydroxy-2-methyl naphthoate.

(b) 1-hydroxy-2-methyl naphthoate (30.2 gms., 0.149 mole) was dissolved in 400 ml. of dry 1,1,2,2-tetrachloroethane in an Erlenmeyer flask fitted with a drying tube. The solution was chilled in an ice bath, and anhydrous aluminum chloride (84 gms., 0.625 mole) was added cautiously in portions. After about one-third of the catalyst was added, vigorous hydrogen chloride evolution ceased so that subsequent addition could be made more rapidly. Nitrobenzene (100 ml.) was added to the chilled dark green suspension, and the mixture was swirled intermittently until a rich brown solution resulted. The complex solution was allowed to stand for about ½ hour before use.

3,3-dichloronaphthalide (37.8 gms., 0.149 mole) was dissolved in 100 ml. of 1,1,2,2-tetrachloroethane in a flame-dried 2 liter 3-neck round bottom flask fitted with an addition funnel, air condenser, mechanical stirrer and drying tube. The solution was chilled in an ice bath; the previously prepared complex solution was decanted into the addition funnel and added dropwise over 30–60 minutes to the well-stirred reaction mixture. A rich purple color developed immediately. The reaction mixture was stirred and allowed to come to room temperature overnight.

Excess ice (300–500 gms.) was added cautiously to the almost solid reaction mixture followed by 20 ml. concentrated hydrochloric acid; the addition funnel and condenser were replaced by a Claisen distillation head, and the organic solvents were distilled with steam. The crude product separated as a yellow-brown solid from the hot dilute acid; it was collected directly, and air dried overnight.

Drying was completed in a vacuum oven, and the dried solid was taken up in hot glacial acetic acid (about 1 g./10 ml.) and insoluble material was removed by filtration; the ketol crystallized on standing and was collected and dried. Trace impurities were removed by solution in hot toluene (about 1 g./5 ml.) from which any insoluble material was separated. Recovery of 3-hydroxy-3 - (3' - carbomethoxy - 4'-hydroxynaphthyl) naphthalide-1,8 was about 50–60% by weight.

(c) 3-hydroxy - 3 - (3'-carbomethoxy - 4 '- hydroxy-1'-naphthyl) naphthalide-1,8 (50 gms., 0.125 mole) was suspended in dry benzene (500 ml.) in a flame-dried 1 liter round bottom flask fitted with a magnetic stirrer and calcium sulfate drying tube. Thionyl chloride (16.4 gms., 0.137 mole) was added in one portion followed by 2.5 ml. of dry N,N-dimethylformamide. The suspension was stirred at room temperature for 1 day. The 3-chloro-3-(3'-carbomethoxy-4'-hydroxynaphthyl) naphthalide - 1,8 product was collected on a Büchner funnel and washed with a small amount of dry hexane. Residual solvent was removed in a vacuum desiccator.

(1) A fresh amount of silver tetrafluoroborate (20.6 gms., 0.106 mole) was weighed into 900 ml. of dry dioxane. 1-hydroxy - 6 - octadecyloxy-2-naphthoic acid (40.0 gms., 0.088 mole) was then added to the slurry. The reaction was placed under an atmosphere of nitrogen and with good stirring (55.4 gms., 0.132 mole) of the pseudo chloride prepared in step (c) was added. The mixture was then heated to reflux. A deep purple color began to appear as the reaction proceeded with concomitant precipitation of silver chloride. After 2–3 hours of reflux an additional (3.8 gms., 0.02 mole) of silver tetrafluoroborate was added. Reflux was continued for an additional 14 hours. Water, 10 ml. was carefully added to the hot mixture and the reaction then cooled to room temperature and filtered through a pad of "Celite." The brown filtrate was evaporated to dryness and the dark residue triturated with 100 ml. of boiling benzene. After cooling the benzene, the solid was filtered. The benzene filtrate was evaporated in vacuo and the gummy residue dissolved in 50–60 ml. of boiling absolute ethanol. After standing for several hours 7.0 g. of product was filtered. The filtrate was evaporated to half volume and allowed to stand overnight to give approximately 2.0 g. of unreacted acid contaminated with a small amount of product. This filtrate was taken to dryness and the residue dissolved in 50–60 ml. of glacial acetic acid. After remaining overnight an additional 8.4 g. of product was obtained. The combined crops were recrystallized from about 200 ml. of glacial acetic acid to give 11.4 gms. of the half-ester product as a grey-white solid (melting range 230°–232° C.).

(2) The half-ester (5.5 gms., 6.55 mmoles) was dissolved in 250 ml. of warm dioxane and diluted with 150 ml. of ethanol. To the solution was added 250 ml. of 3% potassium hydroxide. The deep blue solution was heated on the steam bath for 2 to 3 hours at which time the color of the reaction mixture was deep green. The solution was cooled to room temperature and acidified with 10% hydrochloric acid while stirring vigorously. A brown gum precipitated which after several hours was sufficiently solidified to be filtered. The solid collected was recrystallized from glacial acetic acid (approximately 1 gm./100 ml.) to give 4.8 gms. of the title compound as a white solid (melting range 263°–265° C.).

The 1-hydroxy-6-octadecyloxy-2-naphthoic acid employed in step (1) above was prepared by adding sodium methoxide (67.4 gms., 1.35 moles) to a solution of 1,6-dihydroxy-naphthalene (100 gms., 0.625 mole) in 900 ml. of dry N,N-dimethyl-formamide saturated with dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2000 gms. of ice. The precipitated dark solid was filtered and dried and then triturated with 1 liter of boiling benzene and filtered free of dark impurities. Recrystallization from water gave 1,6-dihydroxy-2-naphthoic acid as a white solid (melting range 220°–221° C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.65 gms., 0.050 mole). The mixture was heated to reflux and stirred 10–15 minutes and then octadecyl bromide (8.35 gms., 0.025 mole) was added. The reaction was refluxed for 5 hours, cooled and acidified with 20% hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°–165° C.).

The above example was repeated using in step (1), 1-hydroxy-6-octadecyloxy-2-naphthoic acid prepared as follows:

1,6-dihydroxy-2-naphthoic acid was dissolved in dry N,N-dimethylformamide (1 g./10 ml.) in a 3-neck round bottom flask fitted with mechanical stirrer, condenser and thermometer. Potassium tert-butoxide (2 eqv.) was added in a moderately exothermic reaction. The resulting partial solution of dipotassium salt was stirred for 0.5 hr. at 50° C. 1-bromo octadecane (1 eqv.) was added in one portion producing a mildly exothermic reaction. The reaction mixture was maintained at 70–75° C. for 14 hrs. and allowed to cool to room temperature. The solid which separated was collected by suction and washed with several portions of N,N-dimethylformamide and then ether. The cake was taken up in glacial acetic acid (1 g./1 ml.), heated on a steam bath for 0.5 hr., and allowed to cool to room temperature. The crystalline solid was collected, washed with small volumes of acetic acid and then ethanol. After drying the crude solid thoroughly, it was slurried in chloroform (1 g./3 ml.), heated to boiling and then cooled. The 1-hydroxy-6-octadecyloxy-2-naphthoic acid was collected as a crystalline material in about 80% by weight yield.

The above example also was repeated using the 3'-carboxy pseudo chloride intermediate prepared as follows:

The 1:1 adduct of 1-hydroxy-2-naphthoic acid and naphthalaldehydic acid, 0.74 g. (2.0 mmoles), was dissolved in 15 ml. of dry tetrahydrofuran and then diluted in 15 ml. of methylene chloride. Dichlorodicyano-benzoquinone, 0.5 g. (2.2 mmoles), was added to the solution and the reaction mixture refluxed for 16 hrs. The mixture was filtered and the filtrate taken to dryness. The residue was triturated with methylene chloride and filtered again. Evaporation of solvent left crude quinone methide which was taken up in 10% aqueous sodium hydroxide solution, charcoaled and the ketol acid precipitated by addition of 10% hydrochloric acid to give 0.6 g. of solid. Recrystallization from glacial acetic acid gave 0.45 g. of 3-hydroxy-3-(3'-carboxy-4'-hydroxy-1'-naphthyl) naphthalide - 1,8. This ketol was then converted to the corresponding 3-chloro-3-(3' - carboxy-4'-hydroxy-1'-naphthyl) naphthalide-1,8 by treating with thionyl chloride according to the procedure set forth in step (c) above.

A 3'-carboalkoxy pseudo chloride intermediate also may be prepared according to the foregoing procedure. For example, 3-chloro-3-(3'-carbomethoxy-4'-hydroxy-1'- naphthyl)naphthalide-1,8 was prepared in the same manner detailed above except that a 1:1 adduct of 1-hydroxy-2-methyl naphthoate and naphthalaldehydic acid was oxidized to the corresponding 3-hydroxy-3-(3'-carbomethoxy-4'-hydroxy-1'-naphthyl) naphthalide-1,8 which was then treated with thionyl chloride to give the corresponding pseudo chloride.

EXAMPLE 2

Preparation of the compound of Formula 6

A mixture of 3-chloro-3-(3'-carbomethoxy-4'-hydroxynaphthyl) naphthalide-1,8 (0.84 gm., 2.0 mmoles) 2-(bis-trifluoromethyl carbinol)-1-naphthol (0.62 gm., 2.0 mmoles) and silver tetrafluoroborate (0.40 gm., 2.0 mmoles) in 75 ml. of dioxane was refluxed for 4 hours. Water (1 ml.) was added to the warm mixture followed by filtration through "Celite." The filtrate was evaporated in vacuo and the residual gum dissolved in approximately 25 ml. of hot benzene. On cooling 1.0 gm. of precipitate was collected and recrystallized from a mixture of 2 ml. of chloroform and 25 ml. of benzene to give 0.8 gm. of solid (melting range 260°–262° C. dec.). The solid obtained (0.5 gm.) was dissolved in 10 ml. of hot ethanol, and the ethanol solution was added to 100 ml. of 15% aqueous potassium hydroxide. The resulting deep blue solution was heated on a steam bath for 2 hours, cooled to room temperature and acidified with 20% hydrochloric acid. After standing for several hours, 0.35 gm. of the title compound was obtained as a white microcrystalline powder (melting point 227° C. dec.).

Indicator dyes containing as the hydrogen-bonding group, a fluoroalkyl carbinol substituent, form the subject matter of copending U.S. patent application Ser. No. 204,350 of Richard B. Greenwald filed Dec. 2, 1971.

EXAMPLE 3

Preparation of the compound of Formula 4

A mixture of 3-chloro-3-(3'-carbomethoxy-4'-hydroxynaphthyl) naphthalide (0.42 gm., 0.001 mole), methyl-1-hydroxy-8-naphthoate (0.2 gm., 0.001 mole), and silver tetrafluoroborate (0.2 gm., 0.001 mole) in 40 ml. of dioxane was refluxed for 5 hours. The solution was filtered through "Celite," water added and the resulting solution evaporated to dryness and azeotroped several times with methanol. The residue was dissolved in petroleum ether-ethanol and cooled. The precipitate formed was collected and then dissolved in 12 ml. of 25% aqueous sodium hydroxide and 36 ml. of ethanol. The solution was heated on a steam bath for 30 minutes, cooled and made acidic with concentrated hydrochloric acid. The ethanol was evaporated and the solid material collected by filtration was taken up in ether. The ether solution was filtered, evaporated to dryness and triturated with petroleum ether. The petroleum ether was evaoprated to yield the title compound (melting range 206°–210° C. dec.).

EXAMPLE 4

The compound of Formula 7 was prepared following the procedure of Example 1 above except that silver nitrate was used as the heavy metal catalyst.

EXAMPLE 5

The compound of Formula 7 also was prepared following the procedure of Example 1 above using mercuric acetate instead of silver tetrafluoroborate as the heavy metal catalyst.

The indicator dyes produced in accordance with the present invention may be employed in analytical procedures where phthalein indicators are commonly used, for example, to measure changes in pH value and find other uses as well. As discussed above, it has been found that a selectively exposed photosensitive material having a latent image therein may be processed in the presence of extraneous incident radiation actinic thereto by reason of the protection afforded by suitably positioning with respect to the exposure surface of the photosensitive layer an effective concentration of a selected dye or dyes as optical filter agents. The use of indicator dyes derived from phenolic compounds including certain naphthol naphthalides as optical filter agents for protecting photosensitive materials from radiation in the longer wavelength region of the visible spectrum forms the subject matter of application Ser. No. 103,392, now U.S. Pat. 3,702,245.

Since certain changes may be made in the above process and product without departing from the scope of the invention herein involved, it is intended that all matter contained in the above description shall be interpreted as illustrative and not in a limiting sense.

What is claimed is:

1. A method of preparing a naphthalide indicator dye which comprises reacting (a) 3-halo-3-(3'-COOR-4'-hydroxy-1'-naphthyl)naphthalide wherein R is hydrogen or alkyl containing 1 to 20 carbon atoms and (b) a naphthol selected from 1-naphthol and 1-naphthol substituted in the 2- or 8-position with a group selected from carboxy, carbomethoxy, hydroxy, o-hydroxyphenyl, bis trifluoromethyl carbinol, sulfonamido and sulfamoyl, said naphthol being substituted in the 6-position with hydrogen or alkoxy containing 1 to 18 carbon atoms in the presence of a heavy metal salt under anhydrous conditions to form (c) the corresponding 3,3-disubstituted naphthalide.

2. A method as defined in claim 1 wherein said salt is a silver salt.

3. A method as defined in claim 2 wherein said salt is silver nitrate.

4. A method as defined in claim 2 wherein said salt is silver tetrafluoroborate.

5. A method as defined in claim 1 wherein said salt is a mercury salt.

6. A method as defined in claim 5 wherein said salt is mercuric acetate.

7. A method as defined in claim 1 wherein said 3-halo naphthalide is 3-chloro-3-(3'-COOR-4'-hydroxy-1'-naphthyl)naphthalide.

8. A method as defined in claim 7 wherein said R is alkyl.

9. A method as defined in claim 1 which includes the step of converting said COOR group of said 3,3-disubstituted naphthalide to a carboxy group by alkaline hydrolysis.

10. A method as defined in claim 1 wherein said 3-halo naphthalide is 3-chloro-3-(3'-carbomethoxy-4'-hydroxy-1'-naphthyl)naphthalide.

11. A method as defined in claim 10 wherein said naphthol is 2-carboxy-6-n-octadecyloxy-1-napthol.

12. A method as defined in claim 10 wherein said naphthol is 2-bis(trifluoromethyl)carbinol-1-naphthol.

13. A method as defined in claim 10 wherein said naphthol is 8-carbomethoxy-1-naphthol.

14. A compound of the formula:

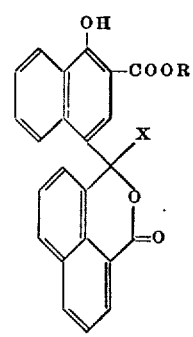

wherein R is hydrogen or alkyl containing 1 to 20 carbon atoms and X is halo.

15. A compound as defined in claim 14 wherein R is hydrogen.

16. A compound as defined in claim 14 wherein R is alkyl.

17. A compound as defined in claim 14 wherein X is choro.

18. 3 - chloro - (3' - carboxy - 4' - hydroxy - 1' - naphyl)naphthalide-1,8.

19. 3 - chloro - 3 - (3' - carbomethoxy - 4' - hydroxy-1'-naphthyl)napthalide-1,8.

References Cited
UNITED STATES PATENTS 3,564,019  2/1971  Holmlund et al. ___ 260—343.2

JOHN M. FORD, Primary Examiner

U.S. Cl. X.R.

96—48 HC; 252—300, 408